US010311556B1

(12) United States Patent
Farivar et al.

(10) Patent No.: US 10,311,556 B1
(45) Date of Patent: Jun. 4, 2019

(54) SYSTEMS AND METHODS FOR IMAGE DATA PROCESSING TO REMOVE DEFORMATIONS CONTAINED IN DOCUMENTS

(71) Applicant: Capital One Services, LLC, McLean, VA (US)

(72) Inventors: Reza Farivar, Champaign, IL (US); Kenneth Taylor, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/025,444

(22) Filed: Jul. 2, 2018

(51) Int. Cl.
*G06K 9/62* (2006.01)
*G06T 5/00* (2006.01)
*G06T 7/194* (2017.01)
*G06T 7/13* (2017.01)
*G06N 3/08* (2006.01)

(52) U.S. Cl.
CPC .......... *G06T 5/006* (2013.01); *G06K 9/6232* (2013.01); *G06K 9/6256* (2013.01); *G06N 3/08* (2013.01); *G06T 7/13* (2017.01); *G06T 7/194* (2017.01); *G06K 2209/01* (2013.01); *G06T 2207/20081* (2013.01); *G06T 2207/20084* (2013.01); *G06T 2207/20092* (2013.01)

(58) Field of Classification Search
CPC .......... G06T 2207/20081; G06T 7/149; G06T 19/20; G06T 7/246; G06T 2207/20164; G06K 9/66
See application file for complete search history.

(56) References Cited

U.S. PATENT DOCUMENTS

2005/0018904 A1* 1/2005 Davis ................... G06K 9/6206 382/181
2005/0175255 A1* 8/2005 Fujimoto ............. G06K 9/3283 382/275

(Continued)

OTHER PUBLICATIONS

Ma et al., DocUNet: Document Image Unwarping via a Stacked U-Net, Jun. 2018, CVPR 2018, pp. 1-10.*

(Continued)

*Primary Examiner* — Vu Le
*Assistant Examiner* — Guillermo M Rivera-Martinez
(74) *Attorney, Agent, or Firm* — Finnegan, Henderson, Farabow, Garrett & Dunner LLP

(57) ABSTRACT

Systems and methods for processing image data representing a document to remove deformations contained in the document are disclosed. A system may include one or more memory devices storing instructions and one or more processors configured to execute the instructions. The instructions may instruct the system to provide, to a machine learning system, a training dataset representing a plurality of documents containing a plurality of training deformations. The instructions may also instruct the system to use the machine learning system to process image data representing a target document containing a target document deformation. The machine learning system may generate restored image data representing the target document with the target document deformation removed. The instructions may further instruct the system to provide the restored image data to at least one of a graphical user interface, an image storage device, or a computer vision system.

20 Claims, 9 Drawing Sheets

(56) References Cited

U.S. PATENT DOCUMENTS

| | | | | |
|---|---|---|---|---|
| 2010/0239118 A1* | 9/2010 | Behm | ............... | G06K 9/3216 |
| | | | | 382/100 |
| 2010/0239165 A1* | 9/2010 | Wu | ............... | G06K 9/3283 |
| | | | | 382/176 |
| 2013/0129248 A1* | 5/2013 | Doublet | ............... | G06T 3/0031 |
| | | | | 382/264 |

OTHER PUBLICATIONS

CVPR 2018 Papers, Jun. 18-22, DocUNet: Paper: Document Image Unwarping via a Stacked U-Net, pp. 1 and 30.*
Yan et al., A DNN Framework for Text Image Rectication From Planar Transformations, Nov. 2016, Tsinghua University, pp. 1-9.*
Szegedy C., et al., *Going Deeper with Convolutions*, "CVPR2015" Computer Vision Foundation (9 pages), Jun. 12, 2015.

* cited by examiner

SYSTEMS AND METHODS FOR IMAGE DATA PROCESSING TO REMOVE DEFORMATIONS CONTAINED IN DOCUMENTS

TECHNICAL FIELD

The present disclosure generally relates to image processing systems and methods, and more particularly, to systems and methods for processing image data representing a document, to remove deformations contained in the document.

BACKGROUND

Individuals and companies often choose to digitize paper documents (e.g., receipts, report cards, etc.) for various reasons. Scanners or digital cameras are commonly used to capture image data representing such documents.

Some documents may have been wrinkled or folded (intentionally or unintentionally) before they are digitized. For example, receipts are often folded and may contain deformations such as wrinkles or creases, which may create certain challenges in the digitization processes (e.g., hinders text recognition processes and the like). Therefore, it is desirable to provide systems and methods for processing image data representing documents to remove deformations contained in the documents.

BRIEF SUMMARY

The disclosed embodiments include systems and methods for processing image data.

In one embodiment, a system is disclosed. The system may include one or more memory devices storing instructions and one or more processors configured to execute the instructions. The instructions may instruct the system to provide, to a machine learning system, a training dataset representing a plurality of documents containing a plurality of training deformations. The instructions may also instruct the system to use the machine learning system to process image data representing a target document containing a target document deformation. The machine learning system may generate restored image data representing the target document with the target document deformation removed. The instructions may further instruct the system to provide the restored image data to at least one of a graphical user interface, an image storage device, or a computer vision system.

In another embodiment, an apparatus is disclosed. The apparatus may include one or more memory devices storing instructions and one or more processors configured to execute the instructions. The instructions may instruct the apparatus to provide, to a neural network, a training dataset representing a plurality of documents containing a plurality of training deformations. The training dataset may include training image data representing a plurality of training documents and transformation image data representing images of the training documents with the training deformations. The neural network may be configured to determine an inverse transformation from the transformation image data to the training image data. The instructions may also instruct the apparatus to use the neural network to process image data representing a target document containing a target document deformation. The neural network may generate restored image data representing the target document with the target document deformation removed. The instructions may further instruct the apparatus to provide the restored image data to at least one of a graphical user interface, an image storage device, or a computer vision system.

In another embodiment, a method is disclosed. The method may include providing, to a neural network, a training dataset representing a plurality of documents containing a plurality of training deformations. The training dataset may include training image data representing a plurality of training documents and transformation image data representing images of the training documents with the training deformations. The method may also include training the neural network to determine an inverse transformation from the transformation image data to the training image data. The method may further include processing image data representing a target document containing a target document deformation, using the neural network, to generate restored image data representing the target document with the target document deformation removed. Furthermore, the method may include providing the restored image data to at least one of a graphical user interface, an image storage device, or a computer vision system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

Figure 1:
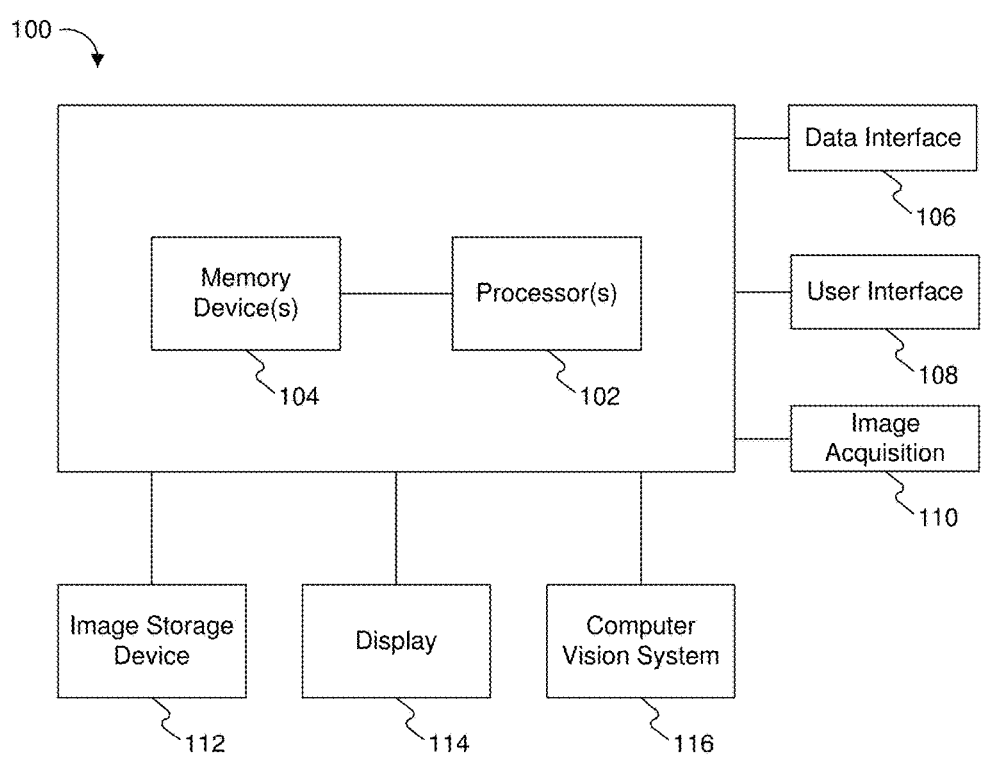
FIG. 1 is a block diagram illustrating an exemplary system, consistent with disclosed embodiments.

FIG. 1 is a block diagram illustrating an exemplary image processing system 100, consistent with disclosed embodiments. It is contemplated that system 100 may be utilized to implement scanners, cameras, copy machines, mobile phones, desktop computers, laptop computers, portable consumer devices, or the like, without departing from the spirit and scope of the present disclosure.

Referring to FIG. 1, system 100 may include one or more dedicated processing units 102, such as application-specific integrated circuits (ASICs), field-programmable gate arrays (FPGAs), or various other types of processors or processing units, coupled with one or more non-transitory processor-readable memories 104 configured for storing processor-executable code. When code is executed by processor 102, processor 102 may perform operations including training a machine learning system for image processing and processing image data representing a target document containing deformations (e.g., a wrinkled receipt) to generate restored image data representing the target document with the deformations removed (e.g., a de-wrinkled receipt).

Figure 2:
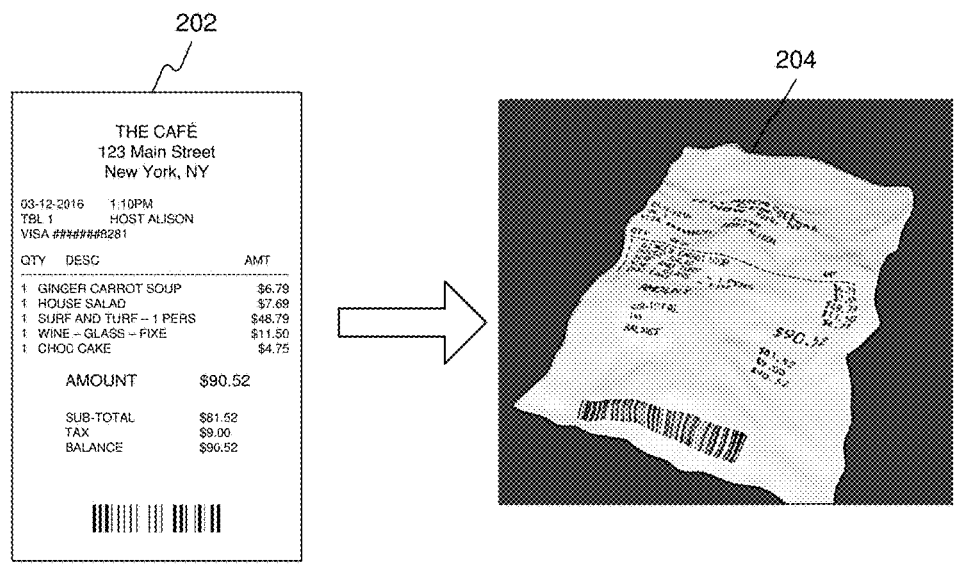
FIG. 2 is an illustration depicting a training document and the training document with training deformations.

In some embodiments, processor 102 may implement a neural network-based machine learning system. The machine learning system may be configured to learn to perform image processing by analyzing a training dataset. Processor 102 may be configured to generate the training dataset, which may represent a number of training documents having various types of synthetically introduced training deformations. With reference to FIG. 2, for example, processor 102 may be configured to generate training image data representing one or more training documents 202. Processor 102 may also transform the training image data to generate transformation image data representing one or more transformed images 204 of training document 202 (transformed to include synthetically introduced training deformations). In some embodiments, processor 102 may transform training image data representing a particular training document 202 multiple times to generate multiple transformed images 204. Alternatively, or additionally, processor 102 may transform training image data representing multiple training documents 202 to generate multiple transformed images 204.

Figure 3:
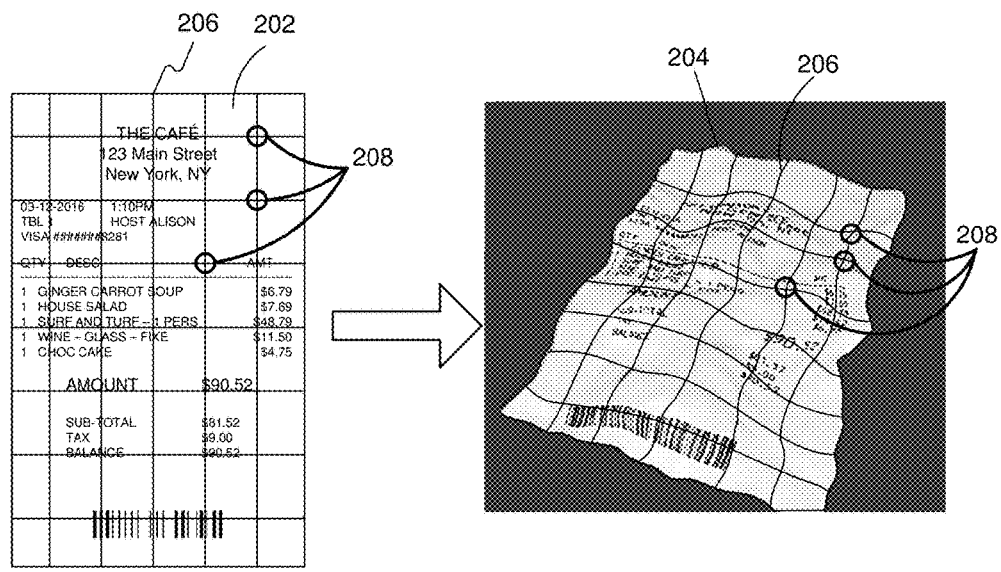
FIG. 3 is an illustration depicting an exemplary process for transforming a training document, consistent with disclosed embodiments.

It is contemplated that processor 102 may introduce training deformations to training documents 202 in various manners. With reference to FIG. 3, for example, processor 102 may identify, based on vertices 208 of a grid 206 digitally overlaid on training document 202, a set of locations within training document 202 to introduce training deformations. The set of locations may include a (randomly selected) subset of vertices 208, or the entire set of vertices 208, without departing from the spirit and scope of the present disclosure. Processor 102 may reposition the set of locations with respect to their original positions within training document 202. Processor 102 may then generate a transformed image 204 to represent training document 202 with the set of locations repositioned, as depicted in FIG. 3.

In some embodiments, processor 102 may utilize three-dimensional (3D) object-rendering techniques to synthetically create one or more light sources and synthetically cast shadows on transformed image 204. In some embodiments, processor 102 may also adjust the perspective of transformed image 204. For instance, processor 102 may apply 3D transformation techniques to synthetically cast shadows and adjust perspectives. Processor 102 may also apply other types of 3D transformation techniques without departing from the spirit and scope of the present disclosure. It is contemplated that processor 102 configured in this manner may be able to generate a variety of transformed images 204 that can simulate real-world documents (e.g., receipts) with various degrees of deformations (e.g., wrinkles), taken under various lighting conditions, or using various camera angles. It is contemplated that generating a variety of transformed images 204 in this manner can help provide better training datasets for the machine learning system.

In some embodiments, processor 102 may perform the transformation process depicted in FIG. 3 in more than one iteration. For instance, after generating transformed image 204, processor 102 may transform transformed image 204 again to synthetically introduce more, finer deformations. Processor 102 may, for example, overlay a second grid (which may be a finer grid compared to grid 206) on transformed image 204, identify a second set of locations based on vertices of the second grid, and reposition the second set of locations with respect to their positions as they appear in transformed image 204. It is contemplated that processor 102 may repeat this transformation process one or more additional times without departing from the spirit and scope of the present disclosure.

In some embodiments, processor 102 may be configured to randomly select the set of locations from vertices 208 of grid 206 (and from vertices of the second grid if the transformation is repeated). Processor 102 may also be configured to randomly determine how to reposition the selected locations with respect to their previous positions (e.g., in terms of which direction and how far each selected location should be repositioned).

In some embodiments, processor 102 may be configured to utilize rectangular grids as depicted in FIG. 3. It is to be understood, however, that such a depiction is merely exemplary and is not meant to be limiting. It is contemplated that processor 102 may utilize grids other than rectangular grids (e.g., triangular grids and the like) without departing from the spirit and scope of the present disclosure. It is also contemplated that processor 102 may be configured to operate without using grids at all. Processor 102 may, for example, randomly identify locations within training document 202 and introduce training deformations without departing from the spirit and scope of the present disclosure.

It is contemplated that by providing the training dataset that includes training image data (e.g., data representing training documents 202) and transformation image data (e.g., data representing transformed images 204) to the machine learning system implemented on processor 102, the machine learning system may be able to analyze and determine an inverse transformation from the transformation image data back to the training image data. Processor 102 may then utilize the machine learning system to process image data representing a target document containing deformations (e.g., a wrinkled receipt) to generate restored image data representing the target document with the deformations removed (e.g., a de-wrinkled receipt).

In some embodiments, processor 102 may implement the machine learning system using a specialized neural network referred to as an image semantic segmentation network. Exemplary implementations of image semantic segmentation networks may include Google® DeepLab and the like, which can produce an inverse transformation based on the training dataset provided. Processor 102 may also implement image segmentation networks disclosed in U.S. patent application Ser. No. 15/963,742, entitled "Generating Synthetic Images as Training Dataset for a Machine Learning Network," which is herein incorporated by reference in its entirety. Alternatively, or additionally, processor 102 may implement other types of machine learning systems without departing from the spirit and scope of the present disclosure.

Figure 4:
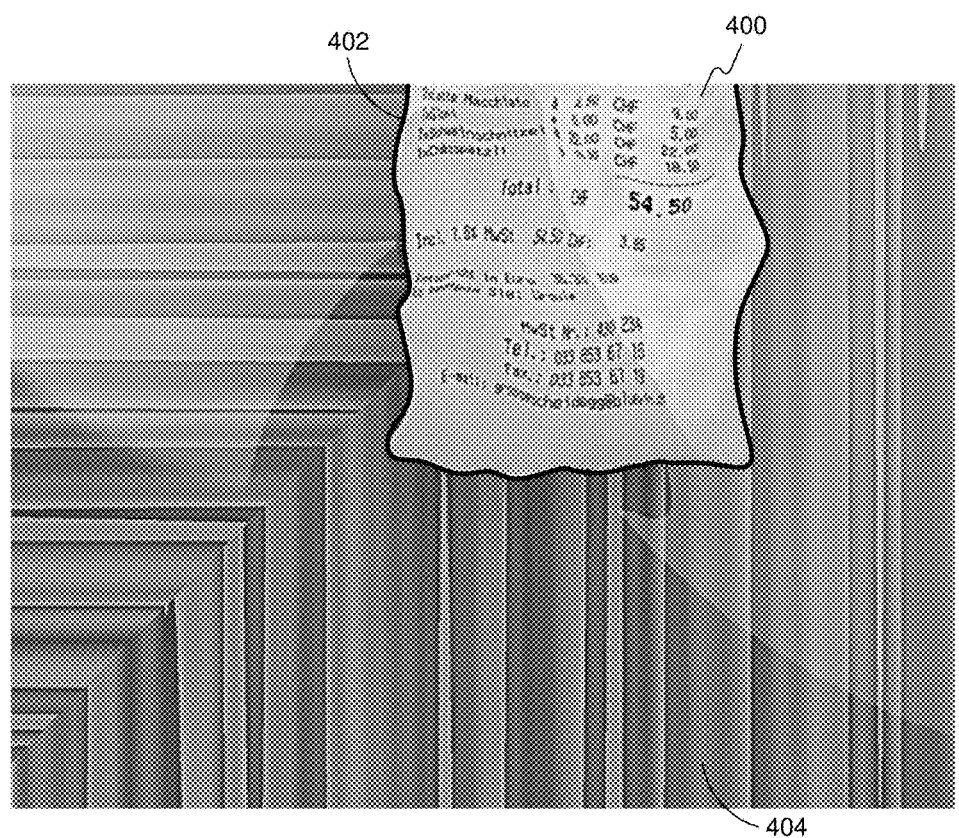
FIG. 4 is an illustration depicting exemplary boundaries of a document, consistent with disclosed embodiments.
Figure 5:
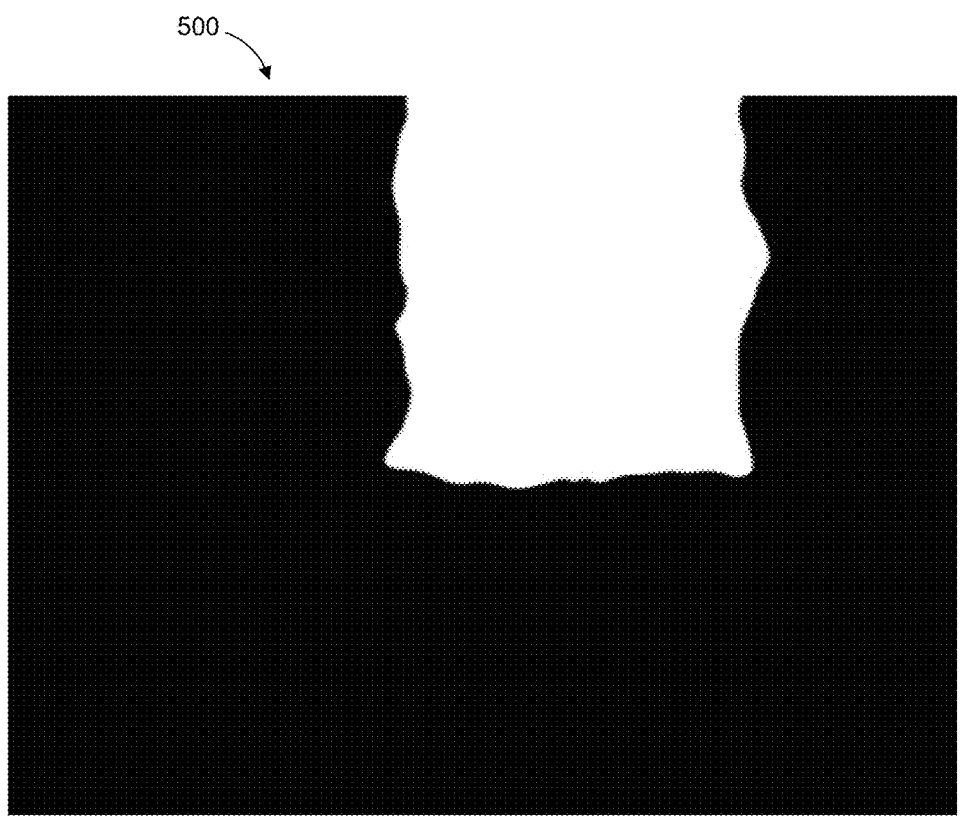
FIG. 5 is an illustration depicting an exemplary semantic segmentation indicating boundaries of a document, consistent with disclosed embodiments.

In some embodiments, processor 102 may provide boundary information as a part of the training dataset to the image semantic segmentation network. With reference to a training document 400 depicted in FIG. 4, for example, processor 102 may provide data indicating boundaries 402 of training document 400. Alternatively, or additionally, processor 102 may provide the boundary information in the form of a semantic segmentation, as depicted in FIG. 5. It is contemplated that providing boundary information as a part of the training dataset may help train the image semantic segmentation network to better separate training document 400 from background information 404.

Figure 6:
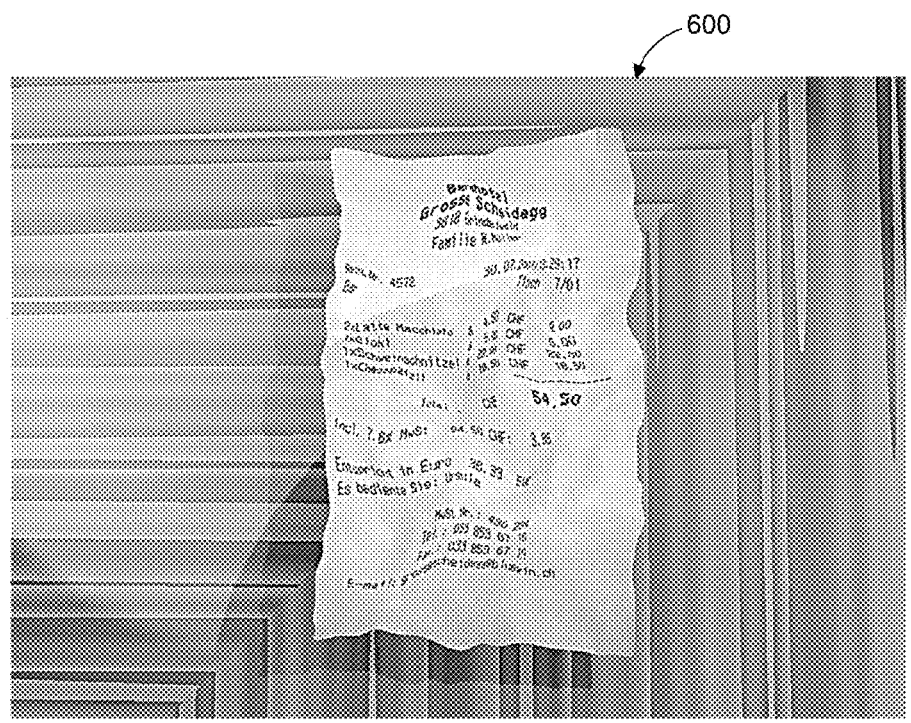
FIG. 6 is an illustration depicting an exemplary target document.
Figure 7:
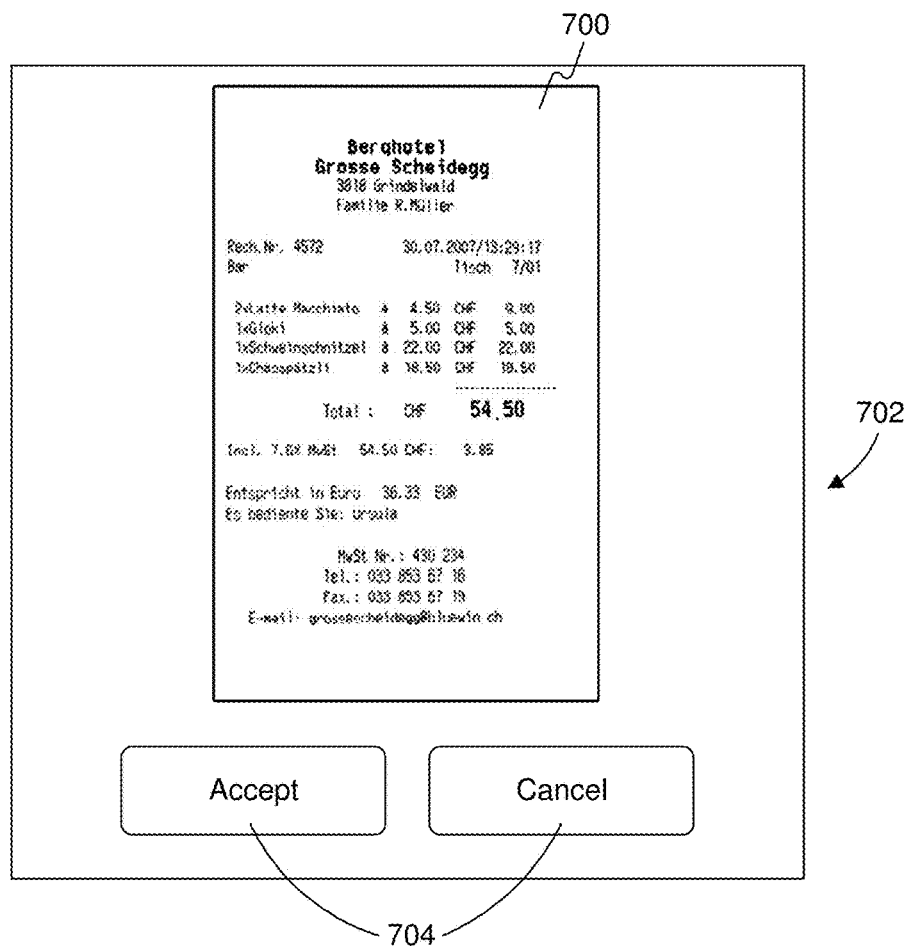
FIG. 7 is an illustration depicting an exemplary graphical user interface, consistent with disclosed embodiments.

Referring now generally to FIGS. 6 and 7, these figures respectively show an image 600 containing a target document (e.g., an image of an actual wrinkled receipt) with deformations and a restored image 700 representing the target document with the deformations removed. It is contemplated that processor 102 may receive image 600 in various manners. For example, processor 102 may receive image 600 via a data interface 106 (e.g., an input/output interface, a network interface, an application programming interface, etc.), a user interface 108 (e.g., a graphical user interface), an image acquisition device 110 (e.g., a camera, a copier, a sensor, etc.), or the like. Processor 102 may utilize the machine learning system (e.g., the image semantic segmentation network) to process image 600. The machine learning system may utilize the inverse transformation obtained through training to inversely transform image 600 to produce restored image 700. In some embodiments, especially in embodiments where boundary information is used as a part of the training process, the machine learning system may be configured to transform the non-uniform boundaries of image 600 into a detected shape (e.g., a rectangular boundary) shown in image 700. Furthermore, in some embodiments, portions of image 600 outside of the detected shape (e.g., the rectangular boundary) may be removed from restored image 700, as depicted in FIG. 7.

It is contemplated that processor 102 may utilize restored image 700 in various manners. In some embodiments, processor 102 may store restored image 700 in an image storage device 112. Processor 102 may also provide restored image 700 to a display 114, which may be configured to present restored image 700 on a graphical user interface 702. In some embodiments, graphical user interface 702 may include a control element 704 for receiving an acceptance or a rejection from a user. In some embodiments, processor 102 may also generate a series of intermediary images (e.g., a series of partially transformed images) to provide a visual depiction of the inverse transformation process. It is contemplated that such a visual depiction may be helpful for a user to decide whether to accept or reject the final restored image 700. It is also contemplated, however, that display of such a visual depiction is optional and may be disabled without departing from the spirit and scope of the present disclosure.

In some embodiments, processor 102 may be configured to provide restored image 700 to a computer vision system 116 (FIG. 1) for further processing. Computer vision system 116 may implement image processing functions, including character recognition, object recognition, code recognition, facial recognition, shape recognition, and the like. In some embodiments, processor 102 and computer vision system 116 may be implemented as components of an integrated device (e.g., a scanner or a mobile phone). In some embodiments, processor 102 may be configured to serve as a pre-processor of images provided to computer vision system 116. Alternatively, processor 102 and computer vision system 116 may be implemented as separate hardware devices or in a distributed manner, without departing from the spirit and scope of the present disclosure.

Figure 8:
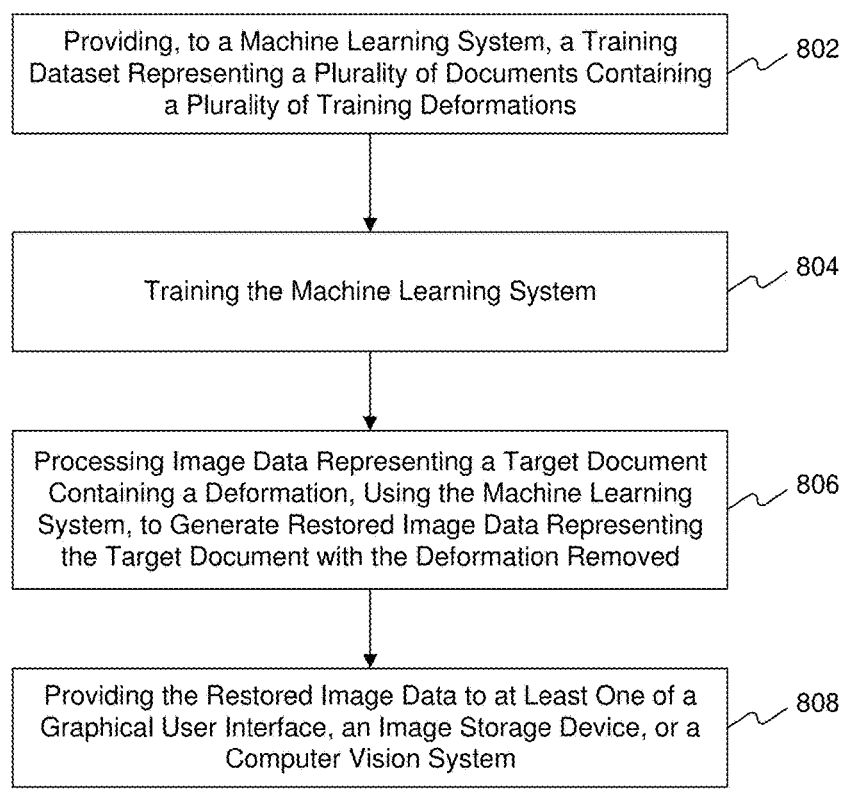
FIG. 8 is a flow diagram of an exemplary method, consistent with disclosed embodiments.

Referring now to FIG. 8, there is shown a flow diagram illustrating an exemplary method 800 for processing image data consistent with the disclosed embodiments. While method 800 is described herein as a sequence of steps, it is to be understood that the order of the steps may vary in other implementations. In particular, steps may be performed in any order, or in parallel. It is to be understood that steps of method 800 may be performed by one or more processors, computers, servers, controllers or the like.

In some embodiments, method 800 may be performed by system 100 (as depicted in FIG. 1). At step 802, method 800 may include providing, to a machine learning system, a training dataset representing multiple documents containing multiple training deformations. The machine learning system may include an image semantic segmentation network. The training dataset may include training image data representing training documents. The training dataset may also include transformation image data representing images of the training documents with the training deformations (e.g., as depicted in FIG. 2).

At step 804, method 800 may include training the machine learning system to determine an inverse transformation from the transformation image data to the training image data.

At step 806, method 800 may include processing image data representing a target document containing a deformation (e.g., as depicted in FIG. 6), using the machine learning system, to generate restored image data representing the target document with the deformation removed (e.g., as depicted in FIG. 7).

At step 808, method 800 may include providing the restored image data to an image storage device 112, a graphical user interface of a display 114, or a computer vision system 116 (as depicted in FIG. 1).

Figure 9:
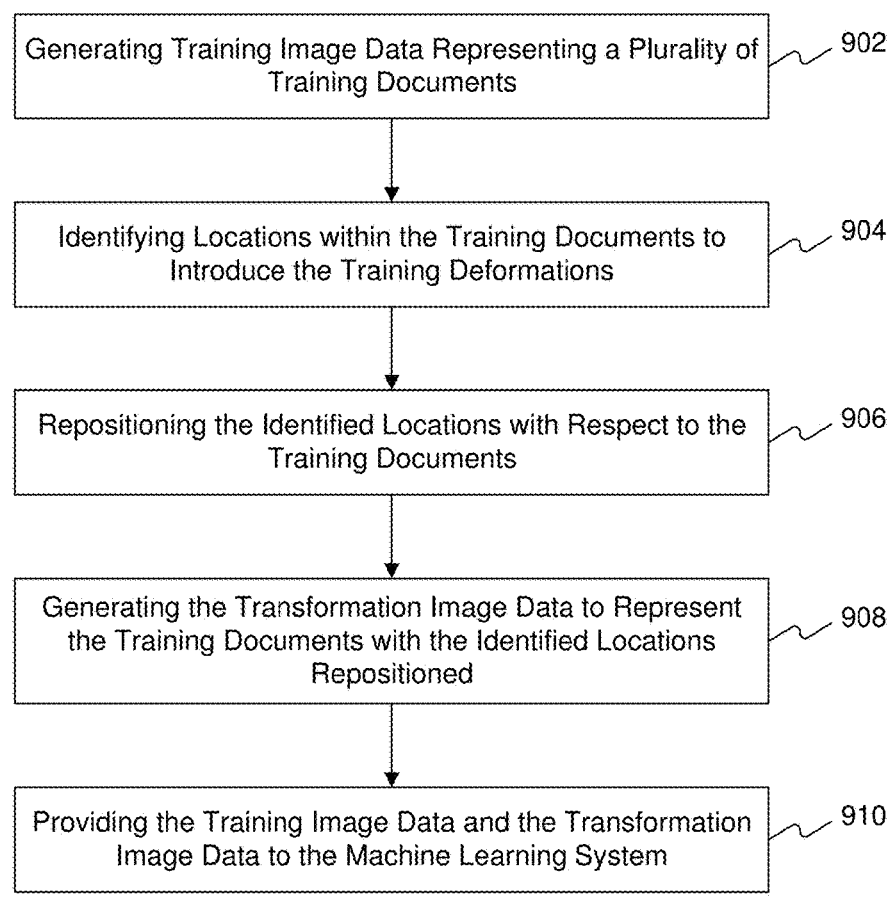
FIG. 9 is a flow diagram of an exemplary method for generating transformation image data, consistent with disclosed embodiments.

Referring now to FIG. 9, there is shown a flow diagram illustrating an exemplary method 900 for generating a training dataset consistent with the disclosed embodiments is shown. While method 900 is described herein as a sequence of steps, it is to be understood that the order of the steps may vary in other implementations. In particular, steps may be performed in any order, or in parallel. It is to be understood that steps of method 900 may be performed by one or more processors, computers, servers, controllers or the like.

In some embodiments, method 900 may be performed by system 100 (as depicted in FIG. 1). At step 902, method 900 may include generating training image data representing multiple training documents 202 (as depicted in FIG. 2). At step 904, method 900 may include identifying locations within the training documents 202 to introduce training deformations. In some embodiments, method 900 may identify the locations utilizing a grid 206 (as depicted in FIG. 3). Alternatively, method 900 may identify the locations randomly without using a grid.

At step 906, method 900 may include repositioning the identified locations with respect to the training documents (e.g., moving the identified locations away from their original positions, as depicted in FIG. 3). At step 908, method 900 may include generating transformation image data to represent the training documents with the identified locations repositioned (e.g., as depicted in FIG. 3). In some embodiments, steps 904-908 may be repeated in one or more iterations. In some embodiments, if steps 904-908 are repeated, step 904 of a subsequent iteration may utilize a finer grid compared to the grid utilized in step 904 in a previous iteration.

At step 910, method 900 may include providing the training image data and the transformation image data as a training dataset to the machine learning system. The machine learning system may then analyze the training dataset to determine an inverse transformation from the transformation image data to the training image data as previously described.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system, comprising:
one or more memory devices storing instructions; and
one or more processors configured to execute the instructions to perform operations comprising:
providing, to a machine learning system, a training dataset representing a plurality of documents containing a plurality of training deformations, providing the training dataset further comprising:
generating training image data representing a plurality of training documents and data indicating boundaries of the training documents;
transforming the training image data, the transforming comprising generating transformation image data representing images of the training documents with the training deformations and data representing boundaries of the training documents with the training deformations; and
providing the training image data and the transformation image data to the machine learning system;
processing image data representing a target document containing a target document deformation, using the machine learning system, to generate restored image data representing the target document with the target document deformation removed; and
providing the restored image data to at least one of a graphical user interface, an image storage device, or a computer vision system.

2. The system of claim 1, wherein the data indicating boundaries of the training documents is provided in a form of a semantic segmentation.

3. The system of claim 1, wherein the training documents with the training deformations have non-uniform boundaries.

4. The system of claim 1, wherein the machine learning system is configured to determine an inverse transformation from the transformation image data to the training image data.

5. The system of claim 1, wherein transforming the training image data further comprises:
identifying locations within the training documents to introduce the training deformations;
repositioning the identified locations with respect to the training documents; and
generating the transformation image data to represent the training documents with the identified locations repositioned.

6. The system of claim 1, wherein transforming the training image data further comprises:
identifying, based on vertices of a first grid overlaid on the training documents, a first set of locations within the training documents to introduce training deformations;
repositioning the first set of locations with respect to the training documents; and
generating the transformation image data to represent the training documents with the first set of locations repositioned.

7. The system of claim 6, wherein transforming the training image data further comprises:
identifying, based on vertices of a second grid overlaid on the training documents, a second set of locations within the training documents to introduce training deformations, the second grid being finer than the first grid;
repositioning the second set of locations with respect to the training documents; and
generating the transformation image data to represent the training documents with the second set of locations repositioned.

8. The system of claim 7, wherein identifying the second set of locations and repositioning the second set of locations are performed after repositioning the first set of locations.

9. The system of claim 7, wherein:
identifying the first set of locations comprises identifying a set of locations randomly selected from the vertices of the first grid; and
identifying the second set of locations comprises identifying a set of locations randomly selected from the vertices of the second grid.

10. The system of claim 7, wherein:
repositioning the first set of locations comprises randomly repositioning the first set of locations with respect to the training documents; and
repositioning the second set of locations comprises randomly repositioning the second set of locations with respect to the training documents.

11. The system of claim 1, wherein:
the machine learning system is configured to implement a neural network; and
the training dataset represents documents containing deformations.

12. The system of claim 11, wherein the neural network comprises an image semantic segmentation network.

13. The system of claim 1, wherein providing the restored image data comprises:
providing the restored image data on the graphical user interface; and
providing a control element on the graphical user interface for receiving one of an acceptance or a rejection of the restored image data.

14. The system of claim 1, wherein the operations further comprise:
performing character recognition, utilizing the computer vision system, on the restored image data.

15. An apparatus, comprising:
one or more memory devices storing instructions; and
one or more processors configured to execute the instructions to perform operations comprising:
providing, to a neural network, a training dataset representing a plurality of documents containing a plurality of training deformations, the training dataset comprising:
training image data representing a plurality of training documents and data indicating boundaries of the training documents; and
transformation image data representing images of the training documents with the training deformations and data representing boundaries of the training documents with the training deformations,
the neural network being configured to determine an inverse transformation from the transformation image data to the training image data;
processing image data representing a target document containing a target document deformation, using the neural network, to generate restored image data representing the target document with the target document deformation removed; and
providing the restored image data to at least one of a graphical user interface, an image storage device, or a computer vision system.

16. The apparatus of claim 15, wherein transforming the training image data further comprises:
identifying locations within the training documents to introduce the training deformations;
repositioning the identified locations with respect to the training documents; and
generating the transformation image data to represent the training documents with the identified locations repositioned.

17. The apparatus of claim 15, wherein transforming the training image data further comprises:
identifying, based on vertices of a first grid overlaid on the training documents, a first set of locations within the training documents to introduce training deformations;
repositioning the first set of locations with respect to the training documents; and
generating the transformation image data to represent the training documents with the first set of locations repositioned.

18. The apparatus of claim 17, wherein transforming the training image data further comprises:
identifying, based on vertices of a second grid overlaid on the training documents, a second set of locations within the training documents to introduce training deformations, the second grid being finer than the first grid;
repositioning the second set of locations with respect to the training documents; and
generating the transformation image data to represent the training documents with the second set of locations repositioned.

19. The apparatus of claim 18, wherein identifying the second set of locations and repositioning the second set of locations are performed after repositioning the first set of locations.

20. A method, comprising:
providing, to a neural network, a training dataset representing a plurality of documents containing a plurality of training deformations, the training dataset comprising:
training image data representing a plurality of training documents and data indicating boundaries of the training documents; and
transformation image data representing images of the training documents with the training deformations and data representing boundaries of the training documents with the training deformations;
training the neural network to determine an inverse transformation from the transformation image data to the training image data;
processing image data representing a target document containing a target document deformation, using the neural network, to generate restored image data representing the target document with the target document deformation removed; and
providing the restored image data to at least one of a graphical user interface, an image storage device, or a computer vision system.

* * * * *